(12) United States Patent
Fuerle

(10) Patent No.: US 6,726,231 B1
(45) Date of Patent: Apr. 27, 2004

(54) VEHICLE

(76) Inventor: Richard D. Fuerle, 1711 W. River Rd., Grand Island, NY (US) 14072

( * ) Notice: Subject to any disclaimer, the term of this patent is extended or adjusted under 35 U.S.C. 154(b) by 0 days.

(21) Appl. No.: 10/065,608

(22) Filed: Nov. 3, 2002

(51) Int. Cl.$^7$ .............................................. A63G 25/00
(52) U.S. Cl. ....................... 280/206; 280/207; 280/208
(58) Field of Search ................................. 280/206, 208, 280/202, 259, 261, 47.32, 78, 781, 207

(56) References Cited

U.S. PATENT DOCUMENTS

| | | | | | |
|---|---|---|---|---|---|
| 88,930 | A | * | 4/1869 | White | 280/208 |
| 286,593 | A | * | 10/1883 | Deputy | 280/208 |
| 351,972 | A | * | 11/1886 | Gibbons et al. | 280/208 |
| 511,039 | A | * | 12/1893 | Harper | 403/195 |
| 520,678 | A | * | 5/1894 | Hendrich | 280/206 |
| 601,107 | A | * | 3/1898 | Simpier | 280/208 |
| 1,095,821 | A | * | 5/1914 | Crawford | 152/97 |
| 1,143,304 | A | * | 6/1915 | Nettle | 152/49 |
| 1,224,747 | A | * | 5/1917 | Ingalls | 152/105 |
| 1,230,588 | A | * | 6/1917 | MacNeece | 152/105 |
| 1,535,090 | A | * | 4/1925 | Baumann | 280/206 |
| 3,183,020 | A | * | 5/1965 | Hawver | 280/208 |
| 3,747,956 | A | * | 7/1973 | Heberlein | 280/206 |
| 4,505,346 | A | * | 3/1985 | Mueller | 180/7.4 |
| 4,873,886 | A | * | 10/1989 | Renner | 74/551.8 |
| 5,769,441 | A | * | 6/1998 | Namngani | 280/208 |

FOREIGN PATENT DOCUMENTS

FR 2829968 A1 * 3/2003 ............. B60B/9/26

* cited by examiner

Primary Examiner—Lesley D. Morris
Assistant Examiner—Daniel Yeagley
(74) Attorney, Agent, or Firm—Richard D. Fuerle

(57) ABSTRACT

A vehicle has two suppoting wheels, each mounted on an axle. A carriage that can hold a human rider is positioned in between the supporting wheels, suspended from the axle. No portion of the carriage extends from the axles a distance greater than the radius of the supporting wheels. A driveable wheel, such as a sprocket gear, between the supporting wheels is mounted on an axle and moves with a supporting wheel. Turning the driveable wheel from the carriage causes the supporting wheel to turn. The supporting wheels can be connected at their peripheries so as to enclose the carriage. Alternatively, the supporting wheels can be unconnected and fixed to the axles so that they can rotate independently. The vehicle can be unpowered, powered by the rider, or powered by an engine. It can be adapted to ride on land, water, or snow and ice.

20 Claims, 12 Drawing Sheets

VEHICLE

BACKGROUND OF INVENTION

This invention relates to a vehicle having two wheels that may or may not be connected, mounted on an axle, where a carriage holding a rider is suspended from the axle between the wheels. In particular, it relates to such a vehicle where the wheels are turned by a rider or an engine in the carriage.

Unicycles, bicycles, tricycles, and cars have 1 to 4 wheels on one or more axles. A carriage that supports one or more riders rests on top of the axle or axles.

SUMMARY OF INVENTION

The vehicle of this invention differs from other wheeled vehicles in that, inside of resting on top of an axle, the carriage holding the rider is suspended from an axle. The two wheels are propelled when the weight of the carriage and rider force down a lever arm, such as a sprocket gear, that is attached to the axle. The carriage can have a seat, so that the rider can pedal from a sitting position, as in a bicycle, or the rider can stand.

The vehicle of this invention can be non-propelled, rider-propelled, or motorized, and can be adapted to go on land, water, or even snow and ice. It can be used for recreational purposes, racing, or to go over rough terrain where the smaller wheels of other types of vehicles may fall into depressions. The land versions are expected to accelerate, decelerate, and turn somewhat sluggishly, but to be fuel-efficient and great fun to use. One land version can, for example, be ridden up a ramp, take off the air, and bounce several times as it rolls along. Because the rider can be enclosed inside the wheels, the wheels protect him from some types of injuries.

DETAILED DESCRIPTION

Figure 1:
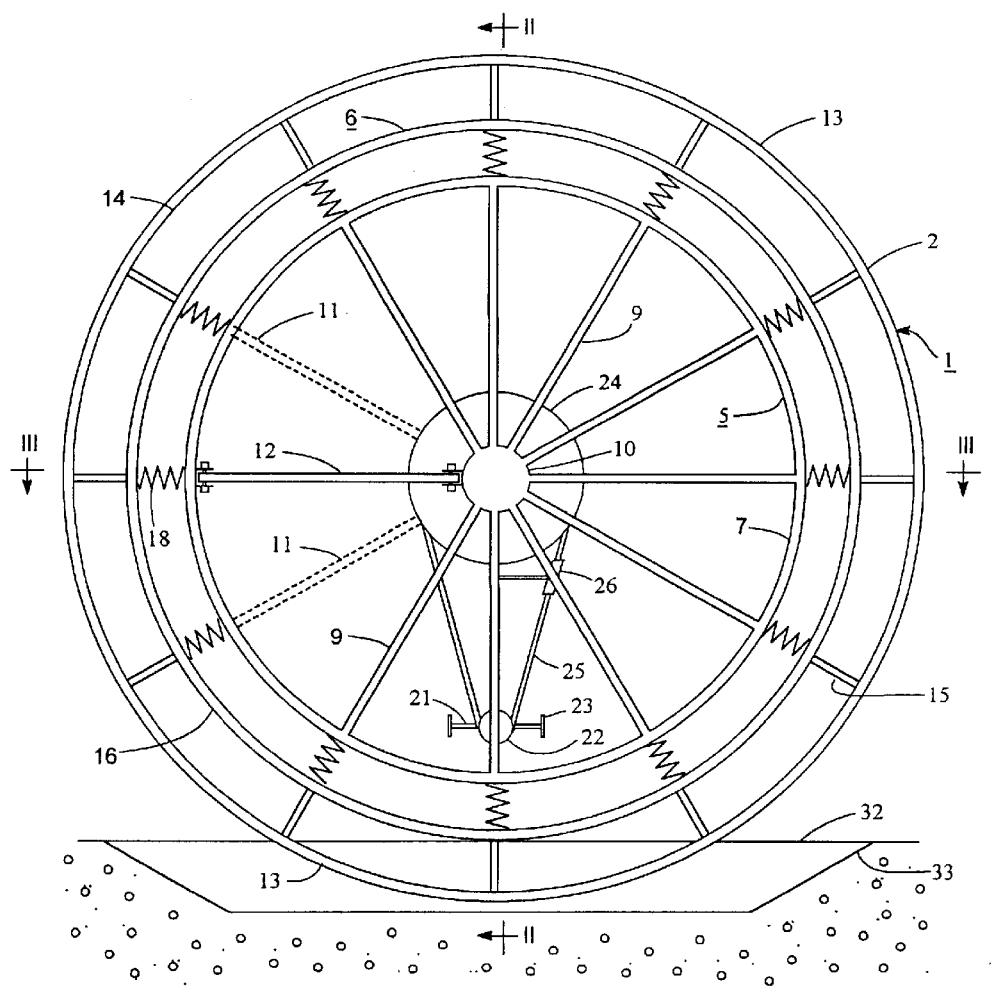
FIG. 1 is a side view of a certain presently preferred vehicle according to this invention, where the rider stands and pedals.
Figure 2:
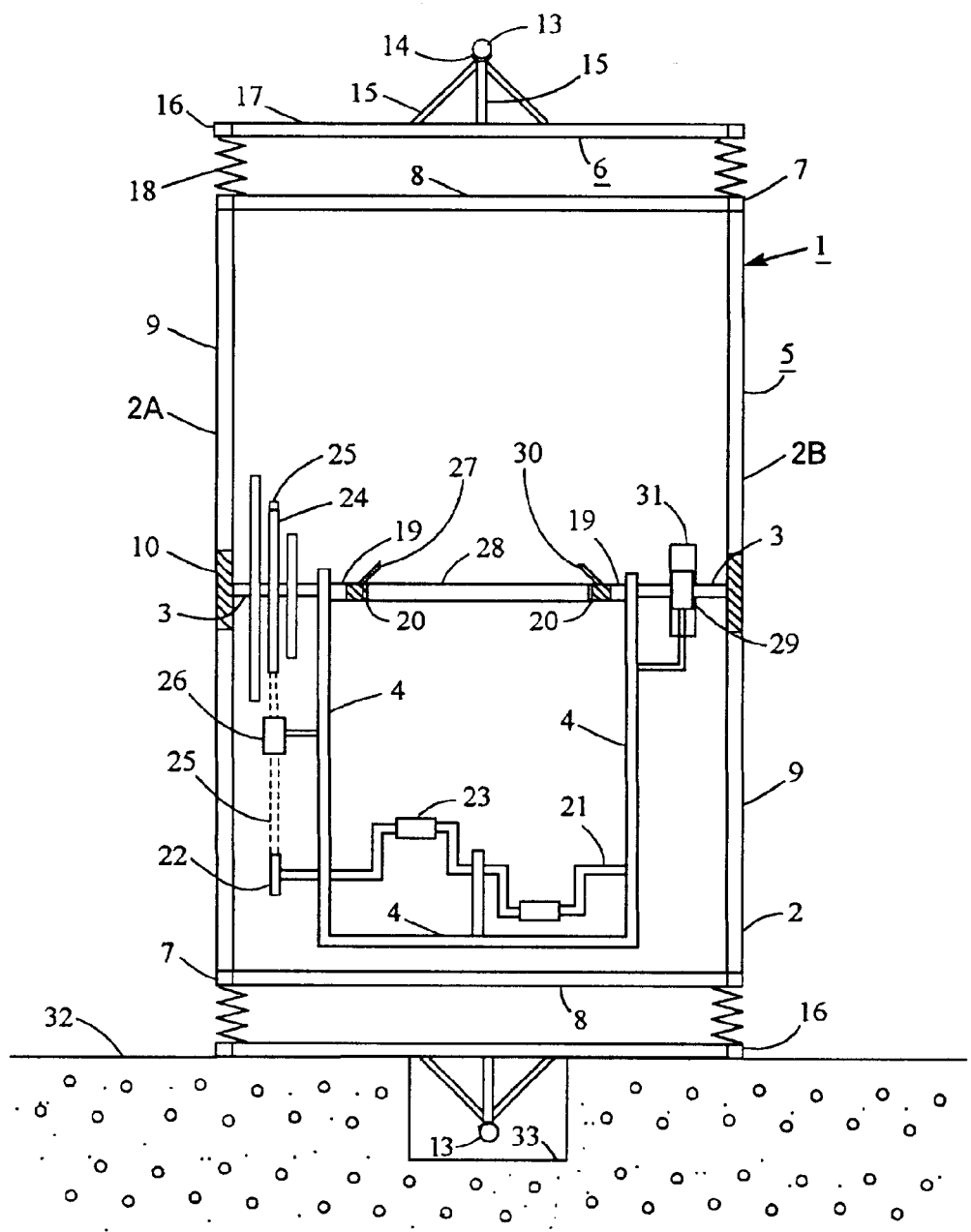
FIG. 2 is an end view through II—II in FIG. 1.
Figure 3:
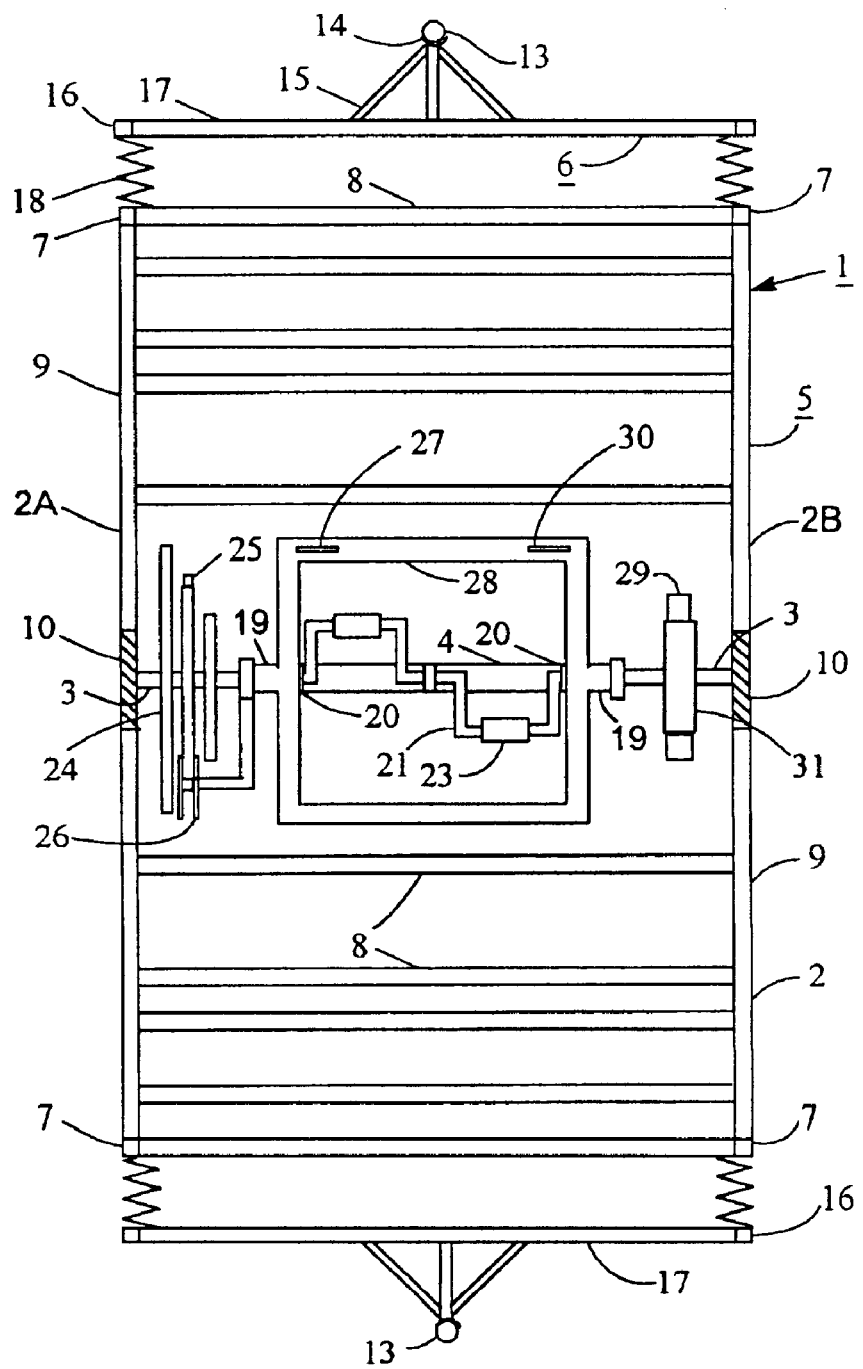
FIG. 3 is a plan view through III—III in FIG. 1.

In FIGS. 1, 2, and 3, vehicle 1 consists of two large wheels 2, left wheel 2A and right wheel 2B, having axle 3 from which is freely suspended carriage 4. Each wheel 2 has two parts, a central portion 5 and a peripheral portion 6. Central portion 5 has two inner rims 7 connected by transverse supports 8 (most of which were omitted from the drawings for clarity). Spokes 9 connect inner rims 7 to hubs 10, which are fixed to axle 3. In FIG. 1, two spokes 11 have been omitted on the left wheel (but are present on the right wheel). A special spoke 12 is removably attached in between missing spokes 11 on the left wheel and connects inner rim 7 to hub 10. This permits a rider to enter vehicle 1 by removing spoke 12, entering central portion 5, then re-attaching spoke 12.

Referring now especially to FIGS. 2 and 3, peripheral portion 6 has a tire 13 held in tire rim 14. Braces 15 connect tire rim 14 to transverse supports 17 which are connected to peripheral rims 16. In between peripheral rim 16 and inner rim 7 are numerous springs 18, which will return to the position shown in the drawings after being compressed or extended.

Carriage 4 is fixed to sleeves 19, which ride freely over axle 3. Axle 3 has a left section and a right section to provide space for the rider. Each section of axle 3 preferably extends as far as possible into sleeves 19. Removable caps 20 are fixed to the ends of the two sections of axle 3 to prevent the two sections from slipping out of sleeves 19. Preferably, ball bearings are employed between sleeves 19 and axle 3 to reduce friction.

To carriage 4 is attached freely rotatable pedal cam shaft 21 having sprocket wheel 22 fixed to one end. Two pedals 23 are rotatably mounted on pedal cam shaft 21. Also fixed to axle 3 is a set of three sprocket wheels 24 (any number of sprocket wheels can be used). Chain 25 rides over sprocket wheel 22 and one of the sprocket wheels 24. Sprocket wheels 24 are preferably larger than sprocket wheel 22 (i.e., each sprocket wheel 24 has more teeth than sprocket wheel 22) so as to provide greater mechanical advantage. Alternatively,. V-shaped pulleys could be used instead of sprocket wheels 22 and 24 and a V-shaped belt could be used to turn the pulleys. Also, sprocket wheels 22 and 24 could be replaced by two gears that directly engage each other without a chain or other connection between them or that engage each other though additional gears.

Derailleur 26 can shift chain 25 to any of the sprocket wheels 24. (The tension sprocket wheel of the derailleur is not shown.) Additional sprocket wheels 22 could also be used with a second derailleur (not shown) to shift chain 25 between them. Derailleur 26 is connected by a cable (not shown) to gear shift 27 on handlebar 28, which is fixed to sleeve 19 so that the rider can use gear shift 27 to control which of the sprocket wheels 24 is engaged by chain 25. Thus, by engaging a larger sprocket wheel 24, the rider can pedal more easily when vehicle 1 is beginning to move and, by engaging a smaller sprocket wheel 24, he can move more rapidly without pedaling faster.

Brakes 29, attached to carriage 4, are connected by a cable (not shown) to hand brake 30, mounted on handlebar 28, so that when the rider squeezes hand brake 30 he causes brakes 29 to grasp brake drum 31, which is fixed to axle 3, thereby slowing down and eventually stopping the movement of vehicle 1. Disc brakes or another type of brake could also be used.

A rider (not shown) stands on pedals 23 and holds onto handlebar 28. He will normally face towards hand brake 30 and gear shift 27 so that he can easily operate the controls. As he pedals, he turns sprocket wheel 22 which causes chain 25 to turn one of the sprocket wheels 24, moving vehicle 1 in the same direction as he is pedaling. The reason this happens is that a sprocket wheel 24 acts as a lever arm on axle 3, and the rider's weight pulls down on the end of that lever arm.

In FIGS. 1 and 2, vehicle 1 is shown with outer rim 16 resting on a support 32 (concrete, ground, or wood, for example), while tire 13 sits in trough 33. Trough 33 is sloped at each end (see FIG. 1) so that as vehicle 1 moves to the end of trough 33, it will be supported by tire 13 instead of by peripheral rim 16.

Figure 4:
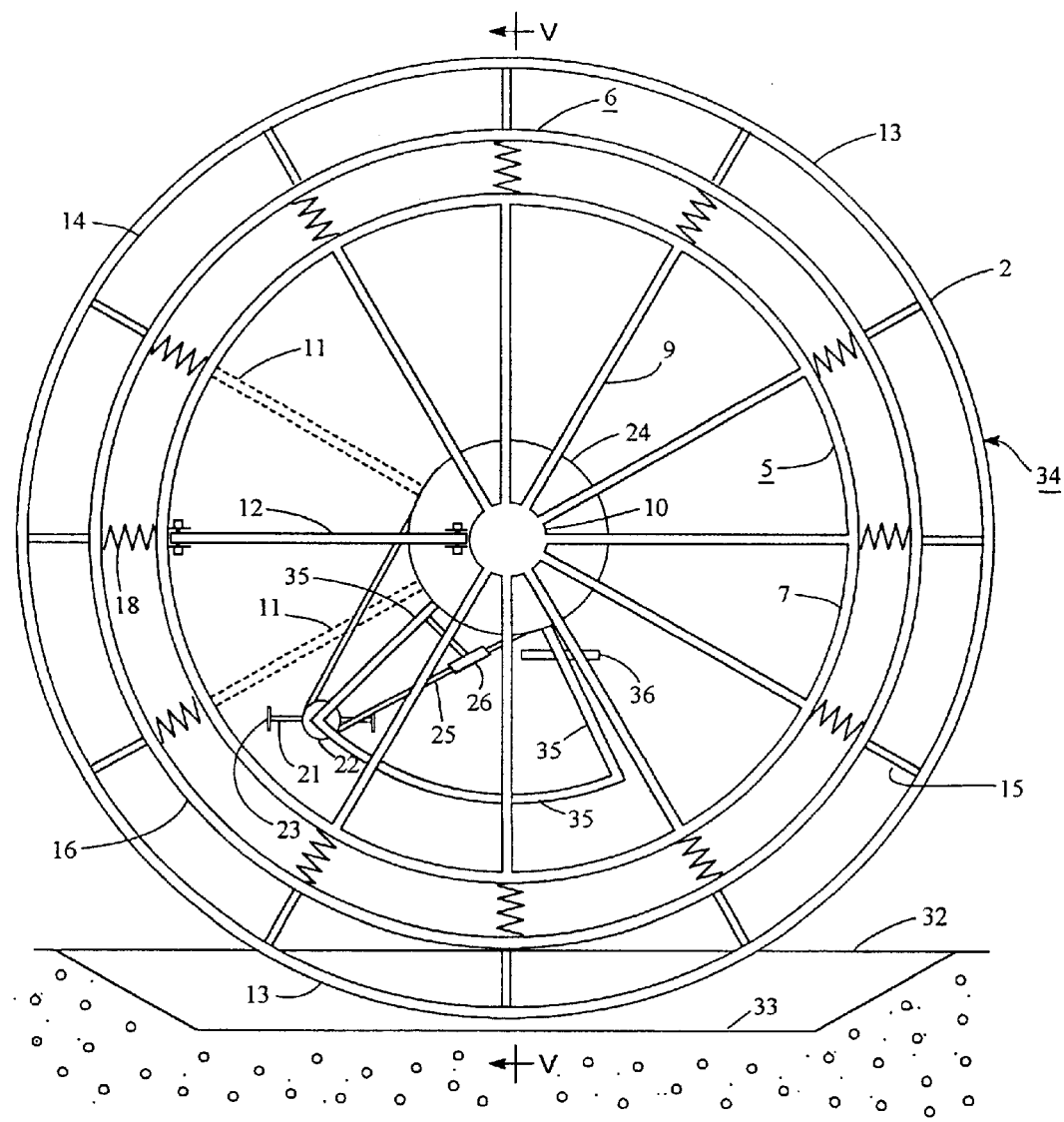
FIG. 4 is a side view of an alternative presently preferred vehicle according to this invention, where the rider sits and pedals.
Figure 5:
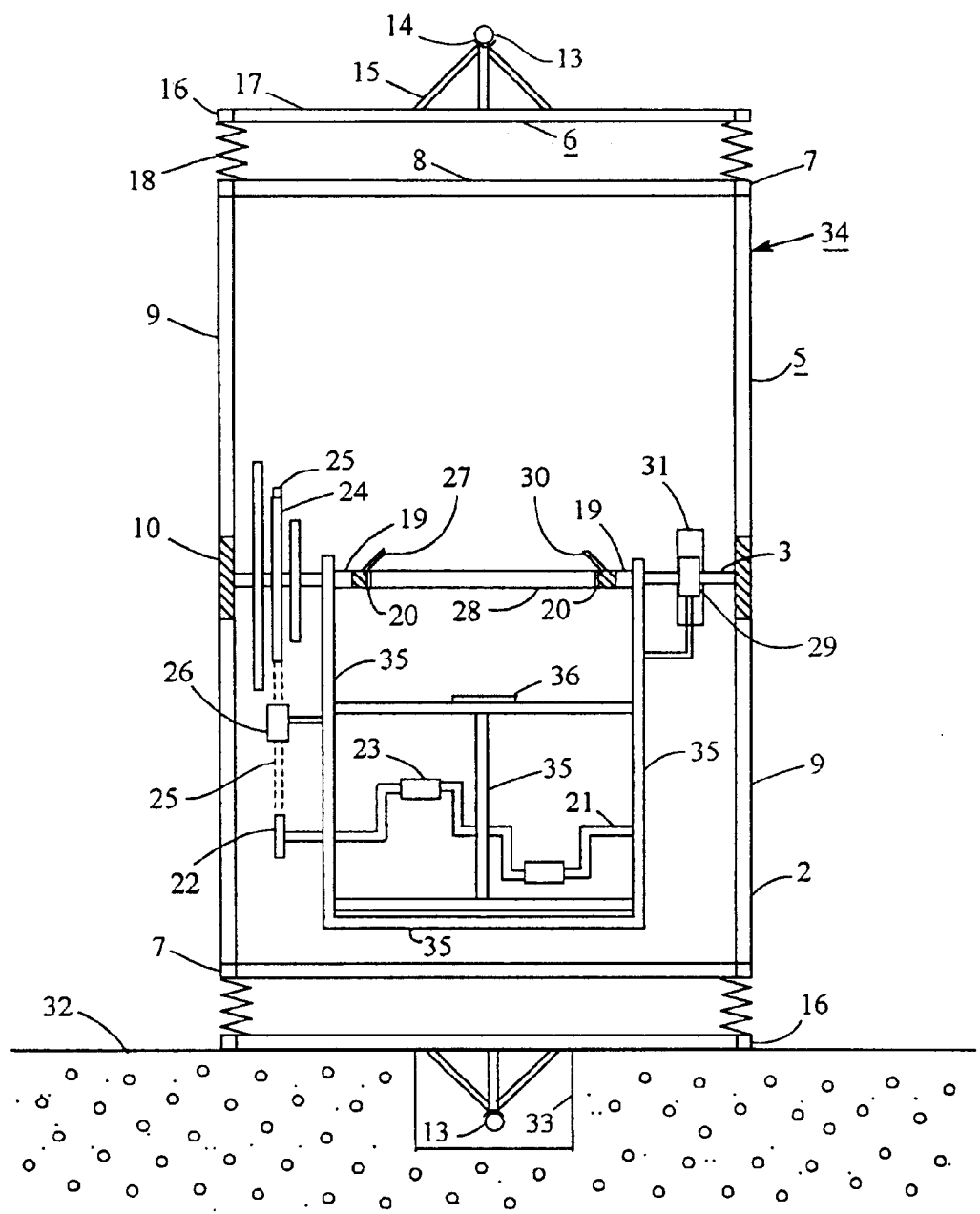
FIG. 5 is a end view through V—V in FIG. 4.

Referring to FIGS. 4 and 5, vehicle 34 is similar to vehicle 1 in FIGS. 1, 2, and 3, except that carriage 35 holds seat 36 so that the rider can pedal in a seated position. Of course, additional seats can be provided, in tandem or side-by-side, to accommodate additional riders. If the vehicle is to be rolled down a hill or other slope, the pedals and gears can be eliminated.

Figure 6:
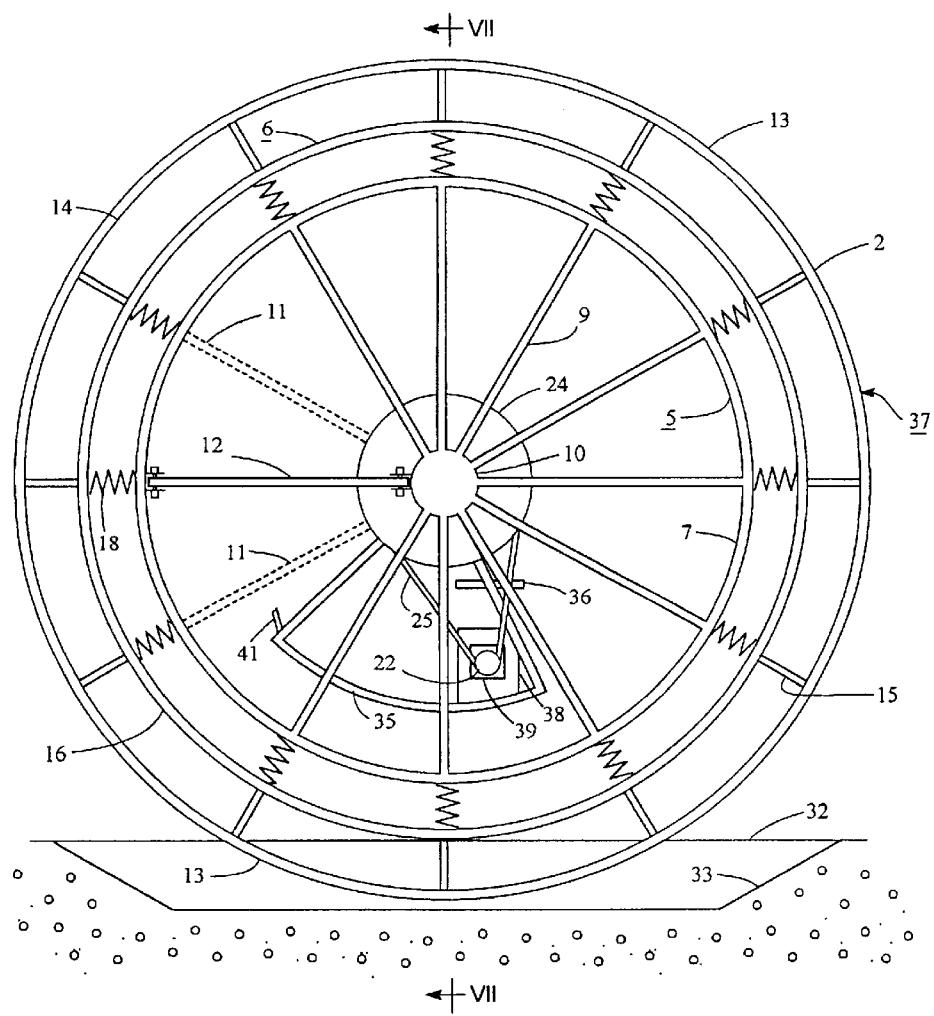
FIG. 6 is a side view of an alternative vehicle according to this invention, which is propelled by an engine.
Figure 7:
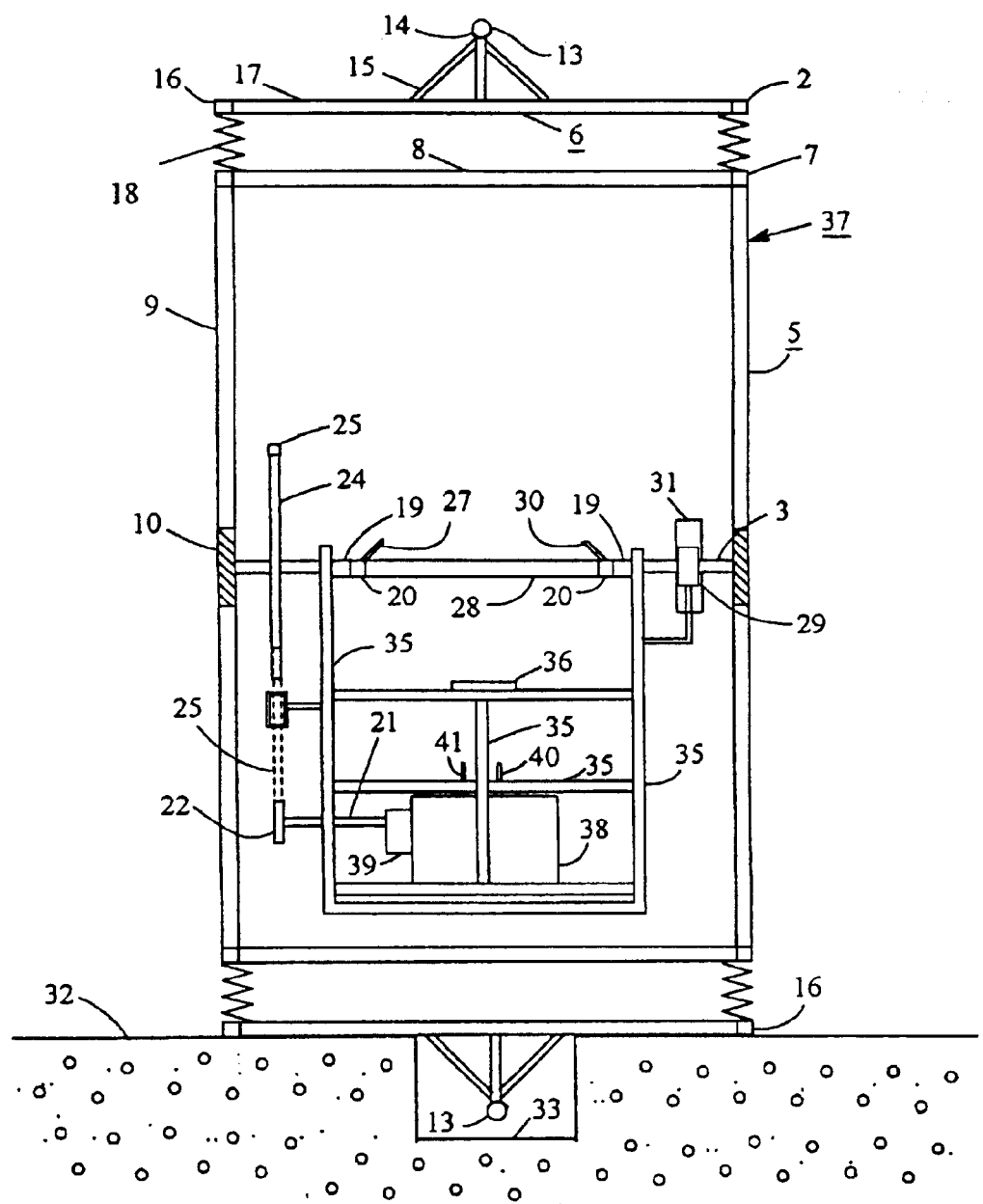
FIG. 7 is a end view through VII—VII in FIG. 6.

Referring to FIGS. 6 and 7, vehicle 37 is similar to vehicle 34 in FIGS. 4 and 5, except that vehicle 37 is powered by a power plant 38 instead of by a rider pedaling and only a single sprocket gear 24 is used as gear shifting is done in transmission-clutch 39. Also, accelerator pedal 40 and brake pedal 41 have been mounted on the floor of carriage 35 so they can be operated by the rider's feet. Power plant 38 is preferably a gasoline engine with a gas tank, but other types of power plants, such as an electric motor and battery, a fuel cell with hydrogen tank, etc. could also be used.

To ride the vehicle, it is placed over a trough, as shown in the drawings, or is otherwise steadied. The rider enters the wheel, climbs into position in the carriage, and begins pedaling (or starts the engine, if it is powered), balancing the vehicle as he would a bicycle. The rider steers by shifting his weight to one side or the other.

The land vehicles of FIGS. 1 to 7 can be modified for use on snow and ice by removing tire 13 and braces 115. Cleats can be placed on peripheral rim 16 for traction on ice. Transverse supports 17 can have a T-shaped cross-section, with the bottom of the T directed outward, to support the vehicle on snow and provide traction.

Figure 8:
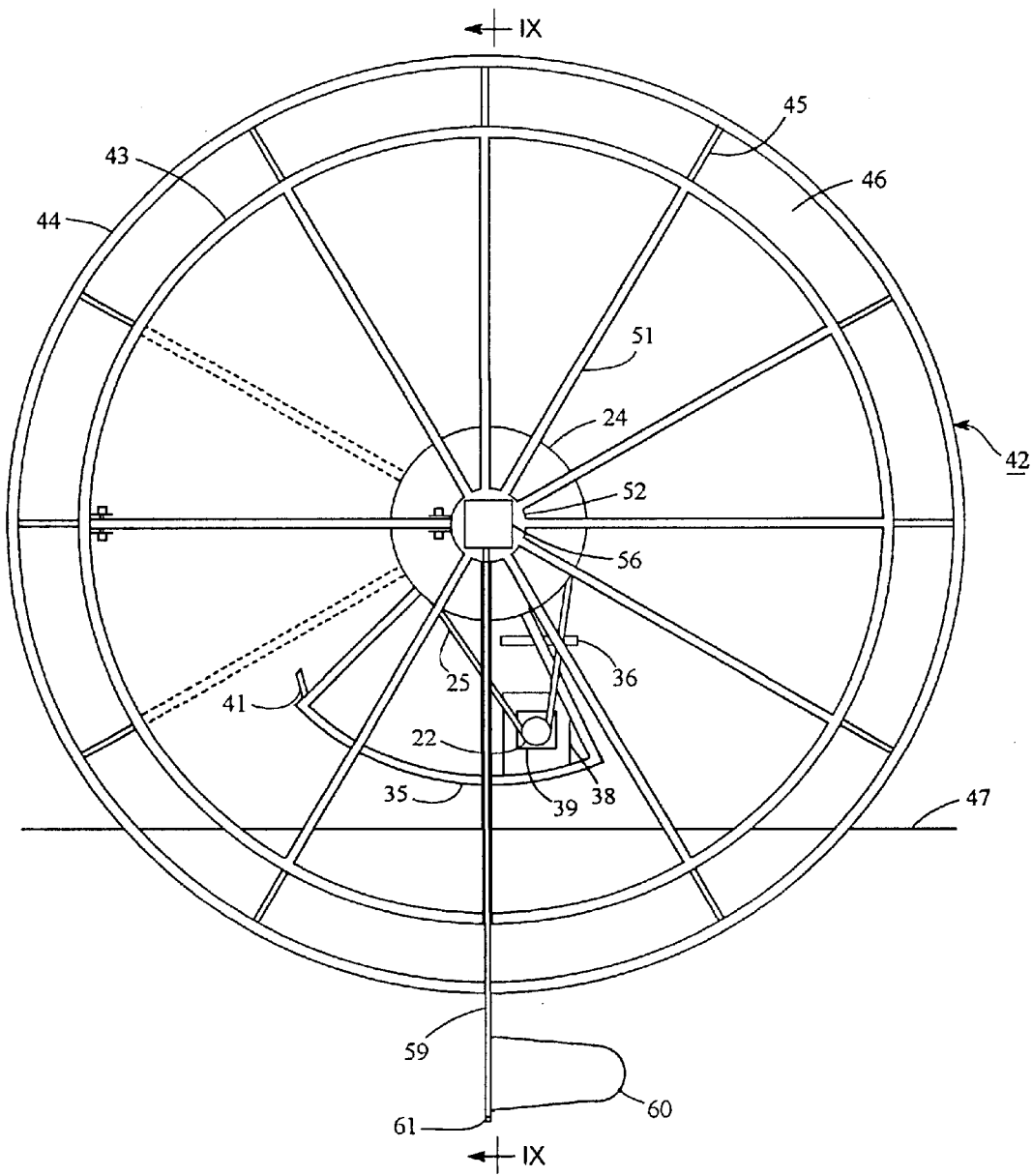
FIG. 8 is a side view of a vehicle adapted for use in water.
Figure 9:
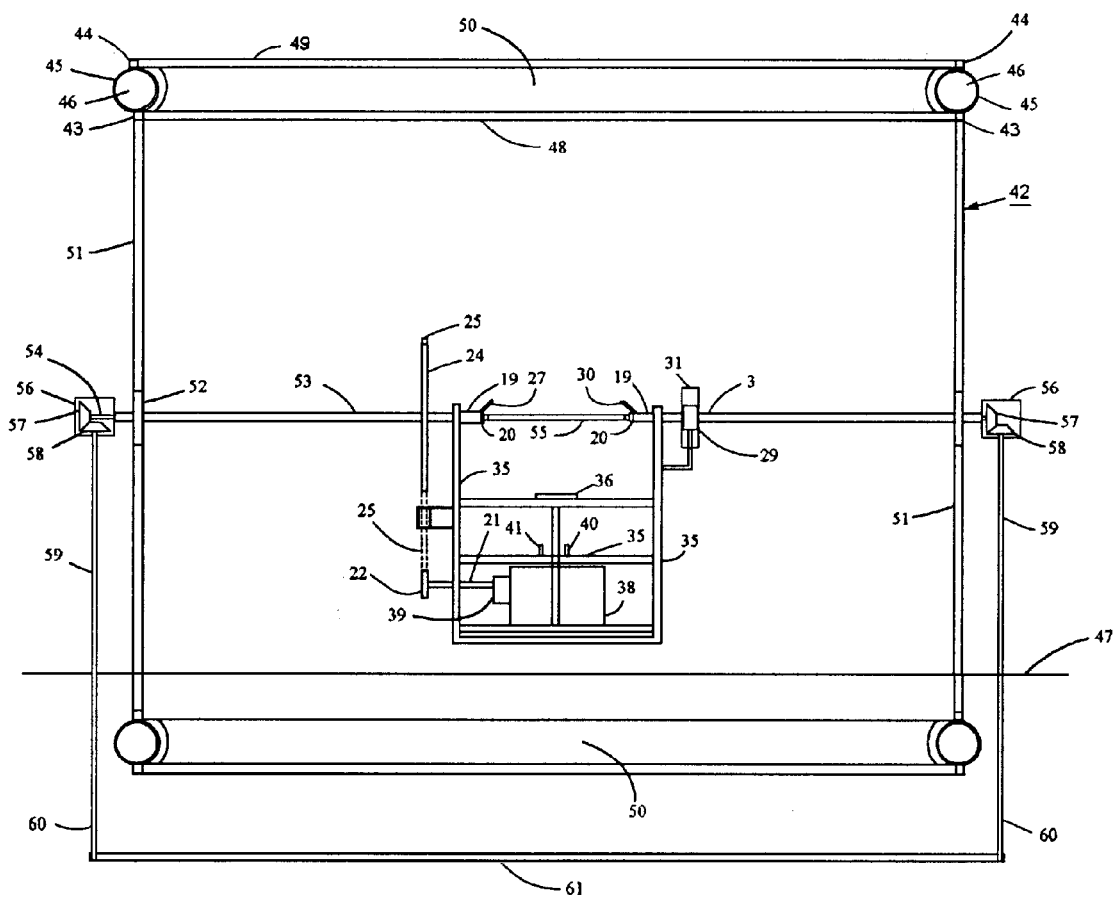
FIG. 9 is an end view through IX—IX in FIG. 8.

The vehicle can also be adapted for use on water. Referring to FIGS. 8 and 9, vehicle 42 is similar to the vehicle shown in FIGS. 6 and 7, but tire 13, spokes 15, springs 18 and certain other parts have been omitted. Held between inner rims 43 and peripheral rims 44 by bands 45, which are attached to rims 43 and 44, are hollow, waterproof, air-filled toroidal floats 46 which enable vehicle 42 to float on water 47. The two floats 46 are widely separated so that vehicle 42 is less susceptible to tipping. Transverse supports 48 and 49 connect inner rims 43 and peripheral rims 44, respectively, and support paddles 50. Spokes 51 connect inner rims 43 to hubs 52. Inside axle 53 is a rod 54 that is connected to rudder control 55, which is shaped like handlebar 28 in FIG. 3. Rod 54 extends from each end of axle 53 into housing 56 where each end is fixed to 45degree gear 57. Each gear 57 engages second 45 degree gear 58 which is fixed to rudder shaft 59. Rudders 60 are fixed to rudder shafts 59 and the ends of rudder shafts 59 are rotatably connected to transverse support 61. In this way, the rider can move rudder control 55 up or down to turn vehicle 42 to the right or left.

Figure 10:
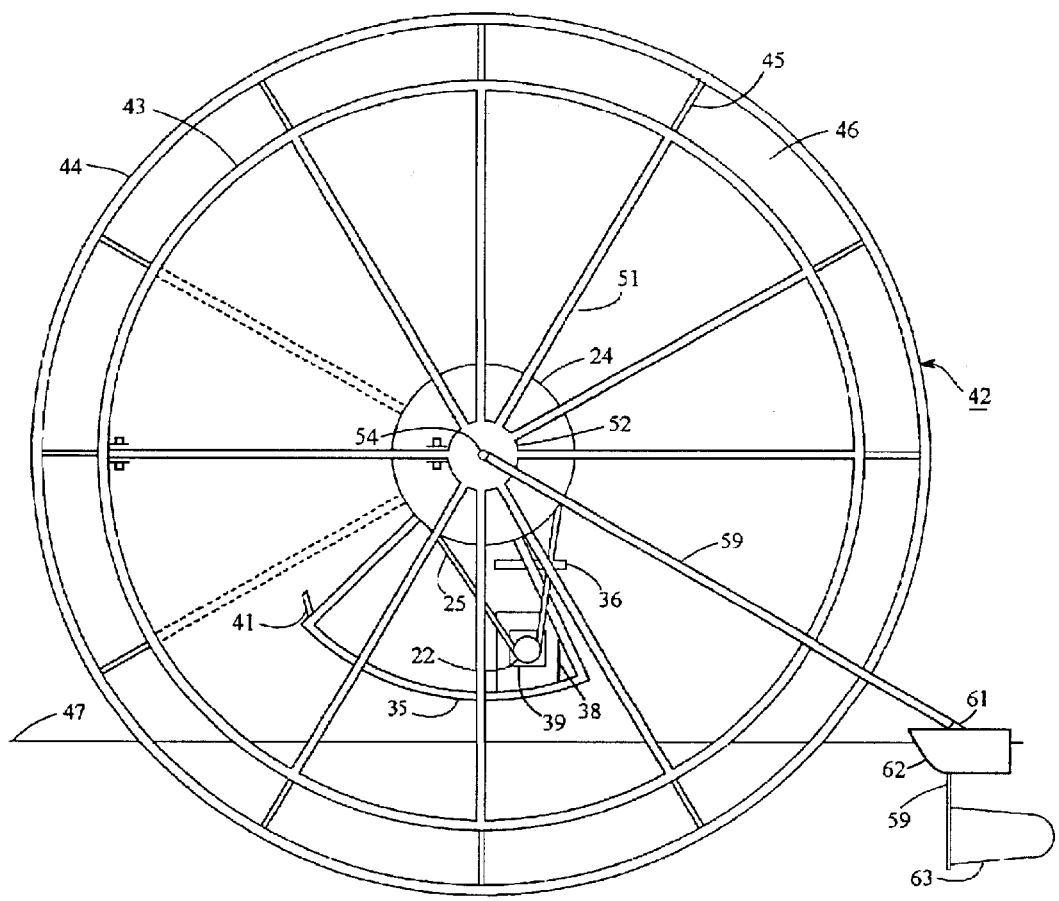
FIG. 10 is a side view of the vehicle of FIG. 8, where a different steering mechanism is used.

Alternatively, the water version shown in FIGS. 8 and 9 can be steered by fixing rod 54 and transverse support 61 directly to rudder shafts 59, as shown in FIG. 10. Floats 62 and radio-controlled rudder 63 are attached to transverse support 61 so that the rider can control the rudder by radio from inside the carriage. Rudder shafts 59 and transverse support 61 can be removed for use on land.

Two large inner tubes can be used as floats 46 and the wheel and carriage can be made of a lightweight material, such as PVC (polyvinyl chloride) or aluminum piping. It is also contemplated the land vehicle of FIGS. 1 to 7 could be combined with the water vehicle of FIGS. 8, 9, and 10 so that the vehicle could go either on land or water.

Figure 11:
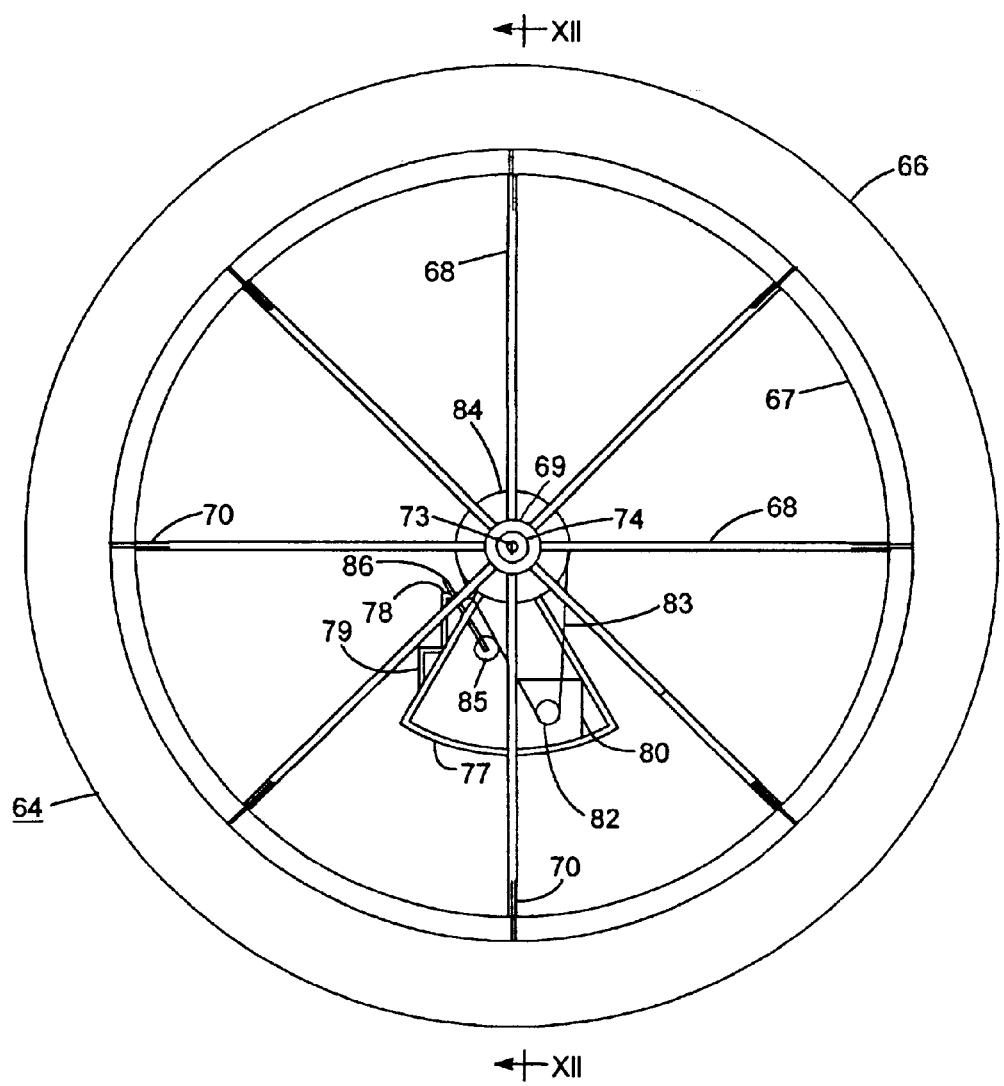
FIG. 11 is a side view of still another alternative vehicle that is adapted for use in either land or water.
Figure 12:
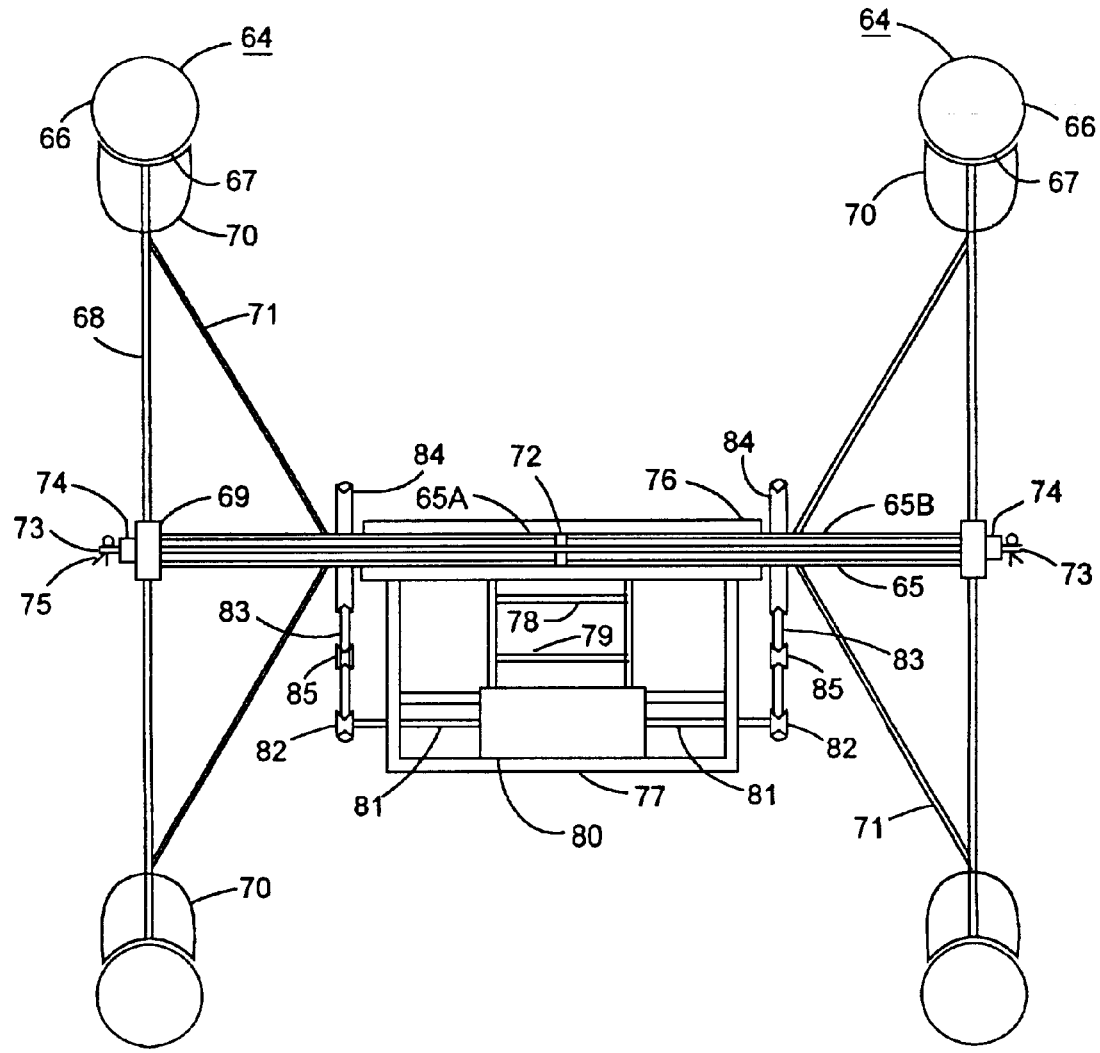
FIG. 12 is an end view through XII—XII in FIG. 11.

FIGS. 11 and 12 are directed to a version of the vehicle of this invention which is adapted to go on either land or water. In the vehicle of FIGS. 11 and 12, the two wheels 64 are not connected together, except at axle 65. Each wheel 64 has an air-inflated tire 66 held in rims 67, which are attached by spokes 68 to hubs 69. Paddles 70 are fixed to rims 67 and spokes 68. Braces 71 are attached between spokes 68 and axle 65. Axle 65 has two parts, 65A and 65B, separated by bearing 72. Axle parts 65A and 65B can rotate independently, but cannot pull apart due to rod 73 inside axle 65. Rod 73 extends from wheels 64 at each end, passing over ball-bearing plates 74, where it is held by pins 75. Sleeve 76 rides freely over axle 65 and supports carriage 77, which extends from axles 65 a distance less than the radius of wheels 64. Carriage 77 is provided with a seat 78 and a foot rest 79 for a rider. Carriage 77 holds engine 80 which had duel shafts 81, each having a pulley 82 fixed at the end. Belts 83 ride loosely over pulleys 82 and over second pulleys 84 that are fixed to axles 65. Third pulleys 85 are attached to lever arms 86 which pivot about their point of attachment to carriage 77. By pushing lever arms 86 downward, third pulley 85 pushes against belts 83 and causes belts 83 to gradually engage pulleys 82 and 84, thereby transferring power to left or right wheel 64 or to both wheels 64. In this way, the rider can increase or decrease the speed of the vehicle and can turn it to the left or right.

What is claimed is:

1. A vehicle for transporting a rider comprising (A) two supporting wheels of about equal diameter, joined at their peripheries, each mounted on an axle, where said axles are concentric and are supported a fixed distance apart by a handlebar that encircles said rider and lies in a plane that includes said axles;

(B) a carriage that can hold a rider, positioned in between said supporting wheels, suspended from said axles, where no portion of said carriage extends from said axles a distance greater than the radius of said supporting wheels;

(C) a driveable wheel having a smaller diameter than said supporting wheels, mounted between a supporting wheel and said carriage on at least one axle, where said driveable wheel rotates with the supporting wheel that is mounted on that axle; and (D) means for rotating said driveable wheel from said carriage.

2. A vehicle according to claim 1 wherein said handlebar is rectangular.

3. A vehicle according to claim 1 wherein said driveable wheel is at least one first sprocket wheel and said means comprises at least one second sprocket wheel fixed to a shaft that is rotatably attached to said carriage, a chain that engages a first sprocket wheel and a second sprocket wheel, and means for rotating said shaft.

4. A vehicle according to claim 3 wherein said shaft is a cam shaft and said means for rotating said shaft are pedals rotatably mounted thereon that can be pushed by said rider.

5. A vehicle according to claim 3 wherein said at least one first sprocket wheel is multiple first sprocket wheels and said chain can be shifted between them by means of a derailleur.

6. A vehicle according to claim 3 wherein said shaft can be rotated by a power plant.

7. A vehicle according to claim 1, wherein said drivable wheel is at least one first pulley and said means for rotating said drivable wheel comprises at least one second pulley fixed to a shaft that is rotatably attached to said carriage and include means for rotating said shaft and include a belt that engages said first pulley and said second pulley.

8. A vehicle according to claim 1 wherein brakes are provided to reduce movement between a supporting wheel and said carriage.

9. A vehicle according to claim 1 wherein said supporting wheels have a central portion and a peripheral portion, and said central portion is connected to said peripheral portion by a multiplicity of coiled springs.

10. A vehicle according to claim 1 wherein said supporting wheels support a concentric tire midway therebetween that has a diameter greater than the diameter of said wheels.

11. A vehicle according to claim 10 wherein said supporting wheels comprise two toroidal floats connected by paddles.

12. A vehicle according to claim 11 including first rods inside said axles extending from each end of said axles, second rods attached at a right angle to each end of said first rods and extending a distance greater than the radius of said supporting wheels, a third rod joining the ends of said two second rods, at least one float to hold said third rod above the water, and at least one radio-controlled rudder attached to said third rod.

13. A vehicle according to claim 1 wherein said supporting wheels each comprise a hub connected to a rim by spokes that lie in a plane.

14. A vehicle for transporting a rider comprising
  (A) two wheels of about equal diameter that comprise a rim joined to a hub by spokes that lie in a plane, where said rims are connected at their periphery, where each hub is mounted on an axle and said axles are concentric and are held in position by a handlebar that encircles said rider and lies in a plane that includes said axles;
  (B) a carriage that can hold a human rider, positioned in between said wheels suspended from said axles and rotatable about said wheels;
  (C) at least one first sprocket wheel fixed to an axle between said wheels;
  (D) at least one second sprocket wheel fixed to a shaft rotatably mounted to said carriage;
  (D) a chain linking a first sprocket wheel and a second sprocket wheel; and
  (E) means for rotating said shaft.

15. A vehicle according to claim 14 wherein a single concentric tire of greater diameter than said wheels is mounted to said wheels midway therebetween.

16. A vehicle according to claim 14 wherein said shaft is a cam shaft having pedals rotatably mounted thereon that can be pushed to rotate said shaft.

17. A vehicle according to claim 14 wherein said shaft can be rotated by an engine mounted on said carriage.

18. A vehicle for transporting a rider comprising
  (A) two supporting wheels of about the same diameter that comprises a rim joined to a hub by spokes that lie in a vertical plane, where said rims are joined at their periphery by horizontal supports, where each hub is fixed to a separate axle and said axles are concentric and are held in position by a handlebar that encircles said rider and lies in a plane that includes said axles;
  (B) a single concentric tire of greater diameter than said wheels mounted at the center of said supports;
  (C) a carriage positioned in between said supporting wheels, suspended from said axles, that can hold a human rider, where no portion of said carriage extends from said axles a distance greater than the radius of said supporting wheels;
  (D) a driveable wheel fixed to an axle between a supporting wheel and said carriage;
  (E) means on said carriage having a shaft for rotating said driveable wheel and;
  (F) wherein said vehicle is positioned over a trough that comprises two horizontal surfaces with a groove therebetween, where the distance between said horizontal surfaces is less than the length of said supports, wherein said supporting wheels can rest on said horizontal surfaces with said tire in said groove.

19. A vehicle according to claim 18 wherein said driveable wheel can be rotated by an engine on said carriage.

20. A vehicle according to claim 18 wherein said shaft is a cam shaft having pedals rotatably mounted thereon that can be pushed to rotate said shafts.

* * * * *